(12) United States Patent
Konomi et al.

(10) Patent No.: US 8,092,568 B2
(45) Date of Patent: Jan. 10, 2012

(54) CERAMIC HONEYCOMB FILTER AND ITS PRODUCTION METHOD

(75) Inventors: Masakazu Konomi, Moka (JP); Hirohisa Suwabe, Moka (JP)

(73) Assignee: Hitachi Metals, Ltd., Tokyo (JP)

( * ) Notice: Subject to any disclaimer, the term of this patent is extended or adjusted under 35 U.S.C. 154(b) by 391 days.

(21) Appl. No.: 12/447,340

(22) PCT Filed: Dec. 21, 2007

(86) PCT No.: PCT/JP2007/074752
§ 371 (c)(1),
(2), (4) Date: May 21, 2009

(87) PCT Pub. No.: WO2008/078716
PCT Pub. Date: Jul. 3, 2008

(65) Prior Publication Data
US 2010/0058725 A1    Mar. 11, 2010

(30) Foreign Application Priority Data

Dec. 27, 2006  (JP) .................................. 2006-351678

(51) Int. Cl.
*B01D 39/14* (2006.01)
(52) U.S. Cl. ........................... 55/523; 264/628; 264/630

(58) Field of Classification Search ............ 55/522–524; 422/169–172, 177–182; 60/297
See application file for complete search history.

(56) References Cited

U.S. PATENT DOCUMENTS

| 2005/0011186 | A1 | 1/2005 | Saito et al. |
| 2005/0160710 | A1 | 7/2005 | Taoka et al. |
| 2008/0220205 | A1* | 9/2008 | Miwa et al. .................. 428/116 |

FOREIGN PATENT DOCUMENTS

| JP | 10-052618 A | 2/1998 |
| JP | 2000-279729 A | 10/2000 |
| JP | 2001-097777 A | 4/2001 |
| JP | 2005-002972 A | 1/2005 |
| JP | 2006-334459 A | 12/2006 |
| WO | 03/074848 A1 | 9/2003 |
| WO | 2004/113252 A1 | 12/2004 |

* cited by examiner

*Primary Examiner* — Duane Smith
*Assistant Examiner* — Amber Orlando
(74) *Attorney, Agent, or Firm* — Sughrue Mion, PLLC

(57) ABSTRACT

A ceramic honeycomb filter comprising a honeycomb structure having large numbers of flow paths partitioned by porous cell walls, and plugs alternately formed in the flow paths on the exhaust-gas-inlet and outlet sides, the outlet-side plugs having porosity of 65% or less, and the upstream-side end surfaces of the outlet-side plugs having surface roughness Ra of 13-50 μm.

5 Claims, 2 Drawing Sheets

CERAMIC HONEYCOMB FILTER AND ITS PRODUCTION METHOD

CROSS REFERENCE TO RELATED APPLICATIONS

This application is a National Stage of International Application No. PCT/JP2007/74752 filed Dec. 21, 2007, claiming priority based on Japanese Patent Application No. 2006-351678 filed Dec. 27, 2006, the contents of all of which are incorporated herein by reference in their entirety.

FIELD OF THE INVENTION

The present invention relates to a ceramic honeycomb filter used for capturing particulate matter in an exhaust gas discharged from diesel engines, etc. to clean the exhaust gas, and its production method.

BACKGROUND OF THE INVENTION

An exhaust gas emitted from diesel engines contains PM (particulate matter) based on carbonaceous soot and SOF (soluble organic fraction) of high-boiling-point hydrocarbons. When such exhaust gas is released into the atmosphere, it may adversely affect human beings and the environment. For this reason, a PM-capturing ceramic honeycomb filter, which may be called "honeycomb filter" in short, has been disposed in an exhaust pipe connected to a diesel engine. One example of honeycomb filters for purifying an exhaust gas by removing particulate matter is shown in FIGS. 2(a) and 2(b). The honeycomb filter 10 comprises a ceramic honeycomb structure comprising porous cell walls 2 defining large numbers of outlet-side-sealed flow paths 3 and inlet-side-sealed flow paths 4, and an outer peripheral wall 1, and upstream-side plugs 6a and downstream-side plugs 6c alternately sealing the outlet-side-sealed flow paths 3 and the inlet-side-sealed flow paths 4 on the exhaust-gas-inlet-side end 8 and the exhaust-gas-outlet-side end 9 in a checkerboard pattern. The honeycomb filter is disposed in a metal container (not shown), with its outer peripheral wall 1 gripped by a holding member (not shown) constituted by a metal mesh, a ceramic mat, etc. such that the honeycomb filter used is stationary.

In the honeycomb filter 10, an exhaust gas is cleaned as follows. As shown by the dotted arrow, the exhaust gas flows into the outlet-side-sealed flow paths 3 opening at the exhaust-gas-inlet-side end 8. While it passes through the cell walls 2, specifically through penetrating holes constituted by communicating pores on and in the cell walls 2, PM contained in the exhaust gas is captured. The cleaned exhaust gas is discharged from the inlet-side-sealed flow paths 4 opening at the exhaust-gas-outlet-side end 9 into the atmosphere.

As PM continues to be captured by the cell walls 2, penetrating holes are clogged with PM on and in cell the walls, resulting in increased pressure loss when the exhaust gas passes through the honeycomb filter. Accordingly, it is necessary to burn PM before the pressure loss reaches the predetermined level to regenerate the honeycomb filter. However, when burning a large amount of PM captured, combustion heat causes melting erosion in the honeycomb filter. This melting erosion tends to occur in portions of the honeycomb filter near the exhaust-gas-outlet-side end 9, in which PM is likely accumulated, particularly in center portions of planes perpendicular to the axial direction of the honeycomb filter.

JP 2005-2972 A discloses a honeycomb filter comprising heat-absorbing portions having larger heat capacity than that of other portions in an exhaust-gas-outlet-side portion, so that the combustion heat is absorbed and dissipated. Specifically, the heat-absorbing portions having larger heat capacity to absorb the combustion heat of PM are formed by making the cell walls thicker in the exhaust-gas-outlet-side portion, providing the cell walls with smaller porosity in the exhaust-gas-outlet-side portion, or making the outlet-side plugs longer. However, partial increase in the cell wall thickness or partial decrease in the cell wall porosity necessitates new steps, suffering large cost increase despite insufficient prevention of the melting erosion of the honeycomb filter. Although longer outlet-side plugs surely provide the entire honeycomb filter has higher heat capacity, the combustion heat of PM is not effectively absorbed by the entire outlet-side plugs, failing to sufficiently prevent melting erosion.

JP 2000-279729 A, JP 10-52618 A and WO2004/113252 A disclose technologies of controlling the porosity, pore diameter and surface roughness of cell walls. JP 2000-279729 A describes the relation between an average pore diameter and the surface roughness Rz (10-point average roughness) of the cell walls when the porosity of the cell walls changes; the larger the porosity or pore diameter, the larger the surface roughness of the cell walls. JP 10-52618 A discloses a method for producing a honeycomb structure having a surface roughness (Rz) of 30 μm or more and/or a pore opening diameter of 20 μm or more in the cell walls, comprising the steps of forming a honeycomb molding with a conductive material, supplying electric current to the honeycomb in the axial direction of penetrating holes in a non-oxidizing atmosphere to cause the cell walls to generate heat to complete sintering. It is described that because crystal particles near the surface having larger free energy are predominantly sintered, grain growth in the sintering is used by this method to provide cell walls with rougher surfaces. WO2004/113252 A discloses that extrusion die slits having larger surface roughness Ra can provide cell walls with larger surface roughness Ra. However, it is difficult to apply the technologies of JP 2000-279729 A, JP 10-52618 A and WO2004/113252 A for controlling the porosity and surface roughness of cell walls to plugs.

OBJECT OF THE INVENTION

Accordingly, an object of the present invention is to provide a honeycomb filter capable of more effectively absorbing the combustion heat of PM by outlet-side plugs than conventional honeycomb filters, thereby reducing melting erosion, and its production method.

DISCLOSURE OF THE INVENTION

As a result of intensive research in view of the above object, the inventors have found that by providing the outlet-side plugs with small porosity, and by providing the upstream-side end surfaces of the outlet-side plugs with large roughness, the combustion heat of PM can be effectively absorbed, thereby remarkably reducing melting erosion. The present invention has been completed based on such finding.

Thus, the ceramic honeycomb filter of the present invention comprises a honeycomb structure having large numbers of flow paths partitioned by porous cell walls, and plugs alternately formed in the flow paths on the exhaust-gas-inlet and outlet sides, the outlet-side plugs having porosity of 65% or less, and the upstream-side end surfaces of the outlet-side plugs having surface roughness Ra of 13-50 μm.

The outlet-side plugs preferably have porosity of 45% or less. The flow-path-direction length of the outlet-side plugs is preferably 6-30 times the width of the outlet-side plugs. The flow-path-direction length of the outlet-side plugs is preferably larger in a center portion than in a peripheral portion in a cross section perpendicular to the flow paths.

The method of the present invention for producing a ceramic honeycomb filter comprising a honeycomb structure having large numbers of flow paths partitioned by porous cell walls, and plugs alternately formed in the flow paths on the exhaust-gas-inlet and outlet sides, the outlet-side plugs having porosity of 65% or less, and the upstream-side end surfaces of the outlet-side plugs having surface roughness Ra of 13 µm or more, comprises the steps of forming the outlet-side plugs with slurry containing ceramic powder having an average particle size of 5 µm or less, accumulating ceramic powder having an average particle size of 10-200 µm on the upstream-side end surfaces of the plugs, and integrally sintering them.

Figure 1:
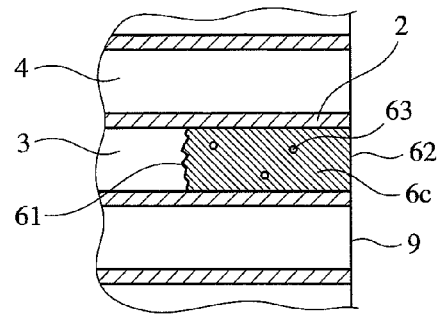
FIG. 1 is a schematic cross-sectional view showing the honeycomb filter of the present invention near outlet-side plugs.
Figure 3:
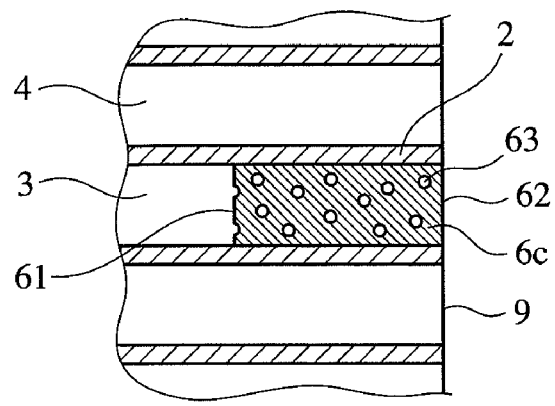
FIG. 3 is a schematic cross-sectional view showing a conventional honeycomb filter near outlet-side plugs.

DESCRIPTION OF THE PREFERRED EMBODIMENTS (1) Surface Roughness and Porosity of Outlet-Side Plugs As shown in FIG. 3, the outlet-side plugs 6c of a conventional honeycomb filter contain a large number of pores 63, which are open on the upstream-side end surfaces 61 to provide surface roughness. It is expected that larger roughness of the upstream-side end surfaces 61 of the outlet-side plugs 6c provides a larger contact area between the outlet-side plugs 6c and the outlet-side-sealed flow paths 3, resulting in more combustion heat of PM entering the outlet-side plugs 6c. In the honeycomb filter of the present invention, as shown in FIG. 1, the upstream-side end surfaces 61 of the outlet-side plugs 6c with surface roughness Ra of 13 µm or more have such large surface area that the combustion heat of PM sufficiently enters the outlet-side plugs 6c. The surface roughness Ra is preferably 22 µm or more, more preferably 30 µm or more, most preferably 40 µm or more. On the other hand, too large surface roughness Ra provides the outlet-side plugs 6c with too low strength, making it likely that part of the upstream-side end surfaces 61 are detached. Accordingly, the surface roughness Ra is 50 µm or less.

If the combustion heat of PM entering the outlet-side plugs 6c is not rapidly conveyed through the outlet-side plugs 6c, the temperature of the outlet-side plugs 6c is excessively elevated at the upstream-side end surfaces 61, resulting in melting erosion. Accordingly, the outlet-side plugs 6c preferably have as large heat capacity and heat conductivity as possible. To that end, it is effective to provide the outlet-side plugs 6c with small porosity, needing that the honeycomb filter of the present invention has porosity of 65% or less. As shown in the schematic view of FIG. 1, the outlet-side plugs 6c having large surface roughness Ra on the upstream-side end surfaces 61 and porosity of 65% or less can have improved heat capacity and heat conductivity, thereby efficiently absorbing and discharging the combustion heat of PM. The outlet-side plugs 6c preferably have porosity of 45% or less.

The porosity of the outlet-side plugs 6c can be minimized by optimizing the particle size distribution of a ceramic material for forming the outlet-side plugs to achieve its closest packing, or by optimizing the percentages of a molding aid, water, etc. in the formation of the outlet-side plugs 6c. The average particle size of the ceramic material for forming the outlet-side plugs is preferably 10 µm or less, more preferably 5 µm or less. The porosity is defined as an area ratio of pores in a cross section obtained by cutting the outlet-side plug 6c in a flow path direction.

As described above, the present invention is characterized in small porosity in the outlet-side plugs 6c, and large surface roughness Ra on their upstream-side end surfaces 61. Methods usable for forming the outlet-side plugs 6c having porosity of 65% or less, and surface roughness Ra of 13 µm or more on the upstream-side end surfaces 61 include, for instance, (a) a method of stamping the upstream-side end surfaces 61 of the formed outlet-side plugs 6c with a bundle of thin metal wires inserted into the outlet-side-sealed flow paths 3 through the exhaust-gas-inlet-side end 8, or (b) a method of forming the outlet-side plugs by small-particle-size ceramic powder (for instance, having an average particle size of 5 µm or less), accumulating large-particle-size ceramic powder (for instance, having an average particle size of 10 µm or more) on the upstream-side end surfaces of the outlet-side plugs, and then integrally sintering them.

In the above method (b), the outlet-side plugs having small porosity are formed by slurry of small-particle-size ceramic powder, and large-particle-size ceramic powder is accumulated on their upstream-side end surfaces to form surface layers having large surface roughness Ra. The average particle size of the large-particle-size ceramic powder is preferably 15 µm or more, more preferably 20 µm or more. The accumulated ceramic powder having too large a particle size provides too large surface roughness Ra, resulting in the upstream-side end surfaces 61 having low strength, and thus making it likely that part of end surfaces are detached. Accordingly, the average particle size of the ceramic powder is 200 µm or less, preferably 150 µm or less. With the large-particle-size ceramic powder mixed with a pore-forming material such as carbon powder, the surface roughness Ra can be further reduced. To provide the surface roughness Ra of 13 µm or more, the surface layers are preferably as thick as 25 µm or more. In order that the combustion heat of PM is easily conveyed through the outlet-side plugs downstream, the thickness of the surface layers is preferably 2 mm or less.

Materials for the outlet-side plugs 6c may be the same as for conventional honeycomb filters, and are, for instance, at least one selected from the group consisting of cordierite, alumina, mullite, silicon nitride, silicon carbide, LAS, aluminum titanate, titania, zirconia and aluminum nitride, preferably ceramic materials comprising two or more of the above components. Among them, a cordierite-based ceramic honeycomb filter is most preferable because of low cost, excellent heat resistance and corrosion resistance, and low thermal expansion.

(2) Length of Outlet-Side Plugs

Longer outlet-side plugs 6c have larger heat capacity, so that the combustion heat of PM is more effectively absorbed by the outlet-side plugs 6c. To obtain sufficient heat capacity, the length of the outlet-side plugs 6c in a flow path direction (horizontal direction in FIG. 1) is preferably 6 times or more the width of the outlet-side plugs 6c (vertical direction in FIG. 1). For instance, when the width of the outlet-side plugs 6c is 1.2 mm, the flow-path-direction length of the outlet-side plugs 6c is preferably 7.2 mm or more. When the width of the outlet-side plugs 6c is 1.5 mm, the flow-path-direction length of the outlet-side plugs 6c is preferably 9 mm or more. Wider outlet-side plugs 6c provide the outlet-side-sealed flow paths 3 with larger area in a cross section perpendicular to the flow paths, thereby capturing a larger amount of PM, and generating larger combustion heat of PM in the regeneration of the honeycomb filter. Accordingly, the present invention determines the flow-path-direction length of the outlet-side plugs 6c not by an absolute value such as 7.2 mm, but by a multiple of the width of the outlet-side plugs 6c.

When an engine starts while the honeycomb filter is cool, the temperature of the honeycomb filter preferably elevates so rapidly that PM starts to be burned before the amount of PM accumulated increases. Accordingly, as long as melting erosion does not occur, the outlet-side plugs 6c need not have very large heat capacity, and the flow-path-direction length of the outlet-side plugs 6c is preferably 30 times or less the width of the outlet-side plugs. With the flow-path-direction length of the outlet-side plugs 6c having an upper limit, it is possible to prevent the total area of the cell walls 2 (effective area of the filter) from becoming too small, contributing to decrease in the pressure loss of the honeycomb filter. The flow-path-direction length of the outlet-side plugs 6c is more preferably 25 times or less the width of the outlet-side plugs.

The flow-path-direction length of the above outlet-side plug 6c is the distance in a flow path direction from a portion of the upstream-side end surface 61 of the outlet-side plug 6c closest to the exhaust-gas-inlet-side end 8 of the honeycomb filter to a portion of the downstream-side end surface 62 of the outlet-side plug 6c farthest from the exhaust-gas-inlet-side end 8 of the honeycomb filter.

Figure 4:
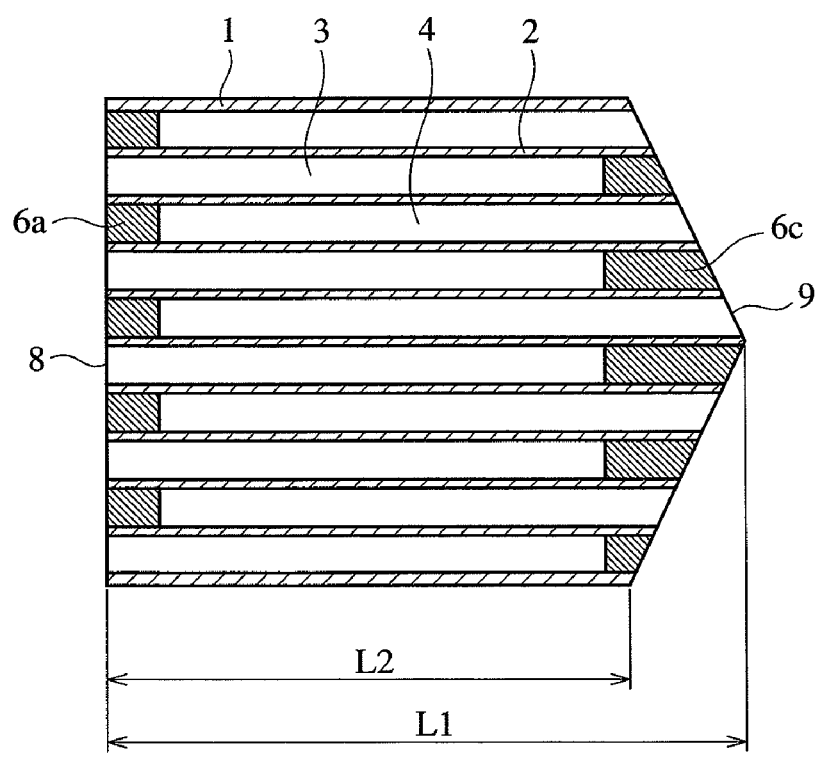
FIG. 4 is a schematic cross-sectional view showing the honeycomb filter of Example 19 in parallel to flow paths.

To increase the heat capacity of the outlet-side plugs in a center portion in a direction perpendicular to the flow paths of the honeycomb filter, which is particularly vulnerable to melting erosion, the outlet-side plugs in a center portion are preferably longer in a flow path direction than those in a peripheral portion, the center and peripheral portions being determined in a cross section perpendicular to the flow paths. In order that the center portion and the peripheral portion have the same effective area in the filter even with the outlet-side plugs longer in the center portion than in the peripheral portion, the honeycomb filter preferably has an exhaust-gas-outlet-side end 9 conically projecting as shown in FIG. 4.

(3) Pore Structure in Outlet-Side Plugs

Even if the outlet-side plugs 6c have flow-path-direction length 6 times or more their width to have increased heat capacity as described above, heat on the upstream side is less transmitted to the downstream side outlet-side when the plugs 6c contain large pores. Particularly if the outlet-side plugs 6c contained large pores near the upstream-side end surfaces 61, the effect of elongating the outlet-side plugs 6c to provide larger heat capacity would disappear. Accordingly, the outlet-side plugs 6c contain preferably no pores having areas of 0.3 mm$^2$ or more, more preferably less than 30% in an area ratio of pores having areas of 0.15 mm$^2$ or more, in a flow-path-direction cross section at least within the distance of 4 times the width of the outlet-side plugs 6c from the upstream-side end surfaces 61. Such large pores tend to be generated as shrinkage voids, when the volume of a plugging material slurry charged into the flow paths to form the outlet-side plugs 6c rapidly decreases by the absorption of water by the cell walls 2. It is possible to prevent large pores from being generated in the outlet-side plugs 6c by adjusting the formulation of slurry to avoid the lack of water, or by adding water to the cell walls 2 in advance. Also, when the filter is erected with the downstream-side end surfaces 62 of the outlet-side plugs 6c upward while drying the slurry charged into the flow paths, large pores are less formed near the upstream-side end surfaces 61.

(4) Carrying Catalyst

The cell walls 2 may carry a catalyst. With a catalyst carried, PM is burned even at a relatively low exhaust gas temperature, resulting in a smaller amount of PM accumulated on the cell wall surfaces, and thus less melting erosion.

The present invention will be explained in further detail by Examples below without intention of restricting the present invention thereto.

Example 1

Production of Honeycomb Filter

Figure 2A:
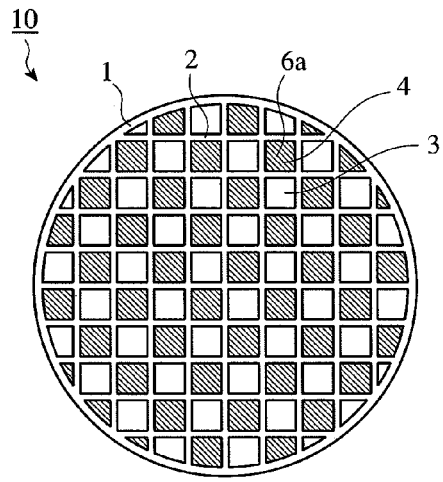
FIG. 2(a) is a schematic cross-sectional view showing one example of honeycomb filters perpendicularly to flow paths.
Figure 2B:
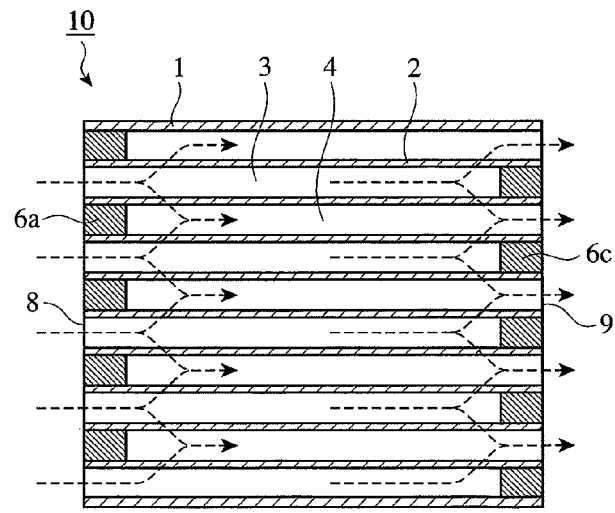
FIG. 2(b) is a schematic cross-sectional view showing one example of honeycomb filters in parallel to flow paths.

To produce the honeycomb filter 10 shown in FIG. 2 by a known method, kaolin powder, talc powder, silica powder, alumina powder and aluminum hydroxide powder were mixed to prepare cordierite-forming material powder comprising 50% by mass of $SiO_2$, 35% by mass of $Al_2O_3$ and 15% by mass of MgO. The amounts of these components may be adjusted in a range of 48-52% by mass for $SiO_2$, 33-37% by mass for $Al_2O_3$ and 12-15% by mass for MgO. This powder was mixed with methylcellulose and hydroxypropyl methylcellulose as binders, a lubricant, and a foamed resin as pore formers. After thorough dry-blending, water was added to carry out sufficient kneading to prepare a moldable ceramic material. This moldable material was extrusion-molded and cut to produce a honeycomb-structure, molded article. This molded article was dried and sintered to produce a cordierite honeycomb structure. This ceramic honeycomb structure had an outer diameter of 150 mm, a length of 202 mm, a cell wall thickness of 0.3 mm, a cell wall pitch of 1.5 mm.

As shown in FIG. 2, the slurry was then charged into flow paths in the honeycomb structure by a known method, to form plugs 6a, 6c at both ends alternately in a checkerboard pattern. The slurry used was obtained by blending cordierite powder having an average particle size of 8 μm with water. The honeycomb structure provided with plugs 6a, 6c was erected with the exhaust-gas-inlet-side end 8 upward, and cordierite powder having an average particle size of 28 μm was sprayed onto the honeycomb structure from above, so that it was accumulated on the upstream-side end surfaces 61 of the plugs 6a, 6c. After drying the slurry, the plugs 6a, 6c were sintered so that they were fixed to the cell walls 2. The honeycomb structure having plugs 6a, 6c sintered thereto was cut at a position of 2 mm from the exhaust-gas-inlet-side end 8, to remove the upstream-side end surfaces of the inlet-side plugs 6a on which large-particle-size cordierite powder was accumulated, thereby obtaining a honeycomb filter 10. The same two honeycomb filters were produced by the same method as described above, and one of them was measured with respect to the length and porosity of the outlet-side plugs 6c and the surface roughness Ra of their upstream-side end surfaces by the following method. These results are shown in Table 1-2.

Measurement of Plug Length

The length of the outlet-side plug 6c was determined by inserting a rod of 1 mm in diameter into the outlet-side-sealed flow path 3 through the exhaust-gas-inlet-side end 8 to know the position of the upstream-side end surface 61 of the outlet-side plug 6c, and measuring the distance from the upstream-side end surface 61 to the downstream-side end surface 62 of the outlet-side plug 6c. The plug length shown in Table 1 is an average value of the lengths of 20 outlet-side plugs 6c selected at random.

Measurement of Surface Roughness of Upstream-Side End Surfaces

With the honeycomb filter cut upstream of the outlet-side plugs 6c, the surface roughness Ra of the upstream-side end surfaces 61 of the outlet-side plugs 6c was measured. The surface roughness Ra of the upstream-side end surfaces 61 is an arithmetic average of the roughness measured by a laser microscope according to JIS B0601, as an average value of absolute deviations of the roughness of the upstream-side end surfaces 61 from the average line.

Measurement of Porosity

The porosity of the outlet-side plugs 6c was determined by cutting the outlet-side plugs 6c in the flow path direction, taking SEM photographs of the cross sections of 10 outlet-side plugs 6c selected at random in center portions in the length and width directions, and image-analyzing the SEM photographs using commercially available image analysis software (Image Pro Plus version 3.0 available from Media-Cybernetics) to calculate the area ratio of pores opening on the plugs.

Evaluation of Melting Erosion

Air was supplied at a flow rate of 15 Nm$^3$/min to one remaining honeycomb filter of Example 1 through the exhaust-gas-inlet-side end 8 to measure initial pressure loss. 13 g/h of carbon powder having a particle size of 0.042 μm (generated by a fine particle generator) was then introduced together with air at a flow rate of 15 Nm$^3$/min into the honeycomb filter through the exhaust-gas-inlet-side end 8 for 1 hour, so that the carbon powder was accumulated in the outlet-side-sealed flow paths 3 of the honeycomb filter. Thereafter, air at 680° C. was supplied at 1 Nm$^3$/min to the honeycomb filter through the exhaust-gas-inlet-side end 8 for 5 minutes, to burn the carbon powder. After additionally repeating the supply and burning of carbon powder four times, the pressure loss was measured again with air at a flow rate of 15 Nm$^3$/min. When the measured pressure loss became less than 95% of the initial pressure, the honeycomb filter was cut to observe melting erosion. When the measured pressure loss was 95% or more of the initial pressure loss, the supply and burning of carbon powder was further repeated five times in the same manner as above except for increasing the amount of carbon powder to 20 g/h (a sufficiently large amount to the actual use environment of honeycomb filters), and the honeycomb filter was cut to evaluate the melting erosion by the standard shown in Table 1-1.

TABLE 1-1

| Evaluation | Evaluation standard of melting erosion |
| --- | --- |
| Poor | When 13 g/h of carbon powder was supplied, melting erosion occurred. |
| Good | When the amount of carbon powder was increased to 20 g/h, melting erosion detrimental to actual use occurred. |

TABLE 1-1-continued

| Evaluation | Evaluation standard of melting erosion |
| --- | --- |
| Very Good | When the amount of carbon powder was increased to 20 g/h, melting erosion not detrimental to actual use occurred. |
| Excellent | Even when the amount of carbon powder was increased to 20 g/h, no melting erosion occurred. |

Examples 2-10 and Comparatives Examples 1-4

The honeycomb filters of Examples 2-10 and Comparative Examples 1-4 were produced in the same manner as in Example 1, except for changing at least one of the particle size of cordierite powder forming the outlet-side plugs 6c, the particle size of cordierite powder accumulated on the upstream-side end surfaces 61 of the outlet-side plugs 6c, and the length of the outlet-side plugs 6c. With respect to the honeycomb filters of Examples 2-10 and Comparative Examples 1-4, the measurement of the length and porosity of the outlet-side plugs 6c and the surface roughness Ra of the upstream-side end surfaces 61, and the evaluation of melting erosion were conducted in the same manner as in Example 1. These results are shown in Table 1-2. The honeycomb filter of Comparative Example 2 had surface roughness Rz of 108 on the upstream-side end surfaces 61, which was measured in the same manner as for the surface roughness Ra of the upstream-side end surfaces 61.

Examples 11-13

The honeycomb filters 10 of Examples 11 and 12 were produced in the same manner as in Examples 9 and 10, except that a plugging material slurry was supplied to the flow paths of each honeycomb structure, into which water was introduced in advance, and dried with the exhaust-gas-outlet-side end 9 upward, and that large-particle-size cordierite powder was sprayed onto each honeycomb structure placed with its exhaust-gas-inlet-side end 8 upward. The impregnation of the honeycomb structure with water was conducted by immersing portions corresponding to the outlet-side plugs 6c in water. The honeycomb filter 10 of Example 13 was produced in the same manner as in Example 12, except for changing the particle size of cordierite powder accumulated on the upstream-side end surfaces 61 of the outlet-side plugs 6c.

With respect to the honeycomb filters of Examples 11-13, the measurement of the length and porosity of the outlet-side plugs 6c and the surface roughness Ra of the upstream-side end surface 61, and the evaluation of melting erosion were conducted in the same manner as in Example 1. These results are shown in Table 1-2. Cross section observation during the porosity measurement revealed that the honeycomb filters 10 of Examples 11-13 did not have pores of 0.3 mm$^2$ or more in area at least in regions within 4 times the width of the outlet-side plugs 6c from the upstream-side end surfaces 61 of the outlet-side plugs 6c, the area of pores as wide as 0.15 mm$^2$ or more being less than 30%.

TABLE 1-2

| No. | Plug Length (mm) | Plug Length/ Width | Plug Porosity (%) | Plug Surface Roughness (Ra) | Evaluation of Melting Erosion |
|---|---|---|---|---|---|
| Example 1 | 10 | 8.3 | 40 | 27 | Very Good |
| Example 2 | 6 | 5 | 65 | 22 | Good |
| Example 3 | 6 | 5 | 50 | 25 | Good |
| Example 4 | 7.2 | 6 | 45 | 26 | Very Good |
| Example 5 | 9 | 7.5 | 40 | 30 | Excellent |
| Example 6 | 10 | 8.3 | 35 | 35 | Excellent |
| Example 7 | 24 | 20 | 25 | 40 | Excellent |
| Example 8 | 36 | 30 | 20 | 45 | Excellent |
| Example 9 | 6 | 5 | 46 | 45 | Good |
| Example 10 | 6 | 5 | 20 | 21 | Good |
| Example 11 | 6 | 5 | 45 | 45 | Very Good |
| Example 12 | 6 | 5 | 20 | 22 | Very Good |
| Example 13 | 6 | 5 | 20 | 13 | Good |
| Comp. Ex. 1 | 7.2 | 6 | 68 | 45 | Poor |
| Comp. Ex. 2 | 7.2 | 6 | 68 | 22 | Poor |
| Comp. Ex. 3 | 7.2 | 6 | 65 | 11 | Poor |
| Comp. Ex. 4 | 7.2 | 6 | 20 | 11 | Poor |

It is clear from Table 1-2 that there was reduced chance of melting erosion due to the combustion heat of PM in the honeycomb filters of the present invention (Examples 1-13) in which the outlet-side plugs had porosity of 65% or less, and the upstream-side end surfaces of the outlet-side plugs had surface roughness Ra of 13 μm or more. Particularly, the chance of melting erosion due to the combustion heat of PM was further reduced in the honeycomb filters of Examples 1 and 4-8 in which the outlet-side plugs had porosity of 45% or less, and the length/width of the outlet-side plugs 6c was 6 or more.

Example 14

The same honeycomb filter as in Example 7 was produced to evaluate PM-burning efficiency by the following procedure.

Evaluation of PM-Burning Efficiency

With air supplied at a flow rate of 5 Nm³/min, pressure difference (pressure loss B) between the upstream side and the downstream side in the honeycomb filter was measured. 8 g/h of carbon powder having a particle size of 0.042 μm, which was generated by a fine particle generator, was introduced together with air at a flow rate of 15 Nm³/min into the honeycomb filter through the exhaust-gas-inlet-side end 8 for 1 hour, so that the carbon powder was accumulated in the outlet-side-sealed flow paths 3 of the honeycomb filter. Further, air at 680° C. was supplied at 5 Nm³/min to the honeycomb filter through the exhaust-gas-inlet-side end 8. While burning carbon powder, pressure difference (pressure loss A) between the upstream side and the downstream side in the honeycomb filter was measured, and the time period T until the ratio of the pressure loss A to the pressure loss B became smaller than 1.05 was measured. The shorter the time period T is, the more easily PM is burned.

Example 15

The PM-burning efficiency was evaluated in the same manner as in Example 14 except for increasing the length of the outlet-side plugs 6c to 30 mm.

Example 16

The PM-burning efficiency was evaluated in the same manner as in Example 14, using the honeycomb filter produced in Example 8.

Example 17

The PM-burning efficiency was evaluated in the same manner as in Example 16 except for further increasing the length of the outlet-side plugs 6c to 42 mm.

The results in Examples 14-17 are shown in Table 2. It was found that PM was easily burned in the honeycomb filters of Examples 14-16 in which the length/width ratios of the outlet-side plugs 6c were 30 or less.

TABLE 2

| No. | Plug Length (mm) | Length/Width of Plugs | Time Period T[1] (min) |
|---|---|---|---|
| Example 14 | 24 | 20 | 4 |
| Example 15 | 30 | 25 | 4.3 |
| Example 16 | 36 | 30 | 5 |
| Example 17 | 42 | 35 | 7 |

Note:
[1] The time period T is an index indicating the PM-burning efficiency, meaning that the shorter the time period T is, the more easily PM is burned.

Example 18

The same honeycomb filter as in Example 8 was produced, and pressure difference (pressure loss) between the upstream side and the downstream side in the honeycomb filter was measured with air supplied at a flow rate of 8 Nm³/min.

Example 19

As shown in FIG. 4, the exhaust-gas-outlet-side end 9 of the honeycomb filter of Example 18 was machined to a conical shape, such that the flow-path-direction length of the outlet-side plugs 6c was larger in a center portion than in a peripheral portion in a cross section perpendicular to the flow paths of the honeycomb filter, and that the length of the flow paths was shorter in the peripheral portion than in the center portion. The pressure loss of this honeycomb filter was measured in the same manner as in Example 18.

The pressure losses of the honeycomb filters of Examples 18 and 19 are shown in Table 3. The pressure loss was expressed by a relative value assuming that Example 18 was 100. In the honeycomb filter of Example 19, the flow-path-direction length was the entire length of the honeycomb filter (L1 in FIG. 4) in a center portion, and the length of the outer peripheral wall of the honeycomb filter (L2 in FIG. 4) in a peripheral portion. The honeycomb filter of Example 19 with flow-path-direction length shorter in a peripheral portion than in a center portion had smaller pressure loss than that of the honeycomb filter of Example 18.

TABLE 3

| No. | Flow Path Length (mm) | | Pressure Loss |
| --- | --- | --- | --- |
| | Center Portion | Peripheral Portion | |
| Example 18 | 200 | 200 | 100 |
| Example 19 | 200 | 169 | 94 |

EFFECT OF THE INVENTION

The honeycomb filters of the present invention suffering less melting erosion than conventional honeycomb filters are suitable as filters for diesel engines, etc. The method of the present invention can produce honeycomb filters having larger heat capacity in outlet-side plugs and effectively absorbing the combustion heat of PM, easily with a smaller number of steps.

What is claimed is:

1. A ceramic honeycomb filter comprising a honeycomb structure having large numbers of flow paths partitioned by porous cell walls, and plugs alternately formed in said flow paths on the exhaust-gas-inlet and outlet sides, said outlet-side plugs having porosity of 65% or less, and the upstream-side end surfaces of said outlet-side plugs having surface roughness Ra of 13-50 µm.

2. The ceramic honeycomb filter according to claim 1, wherein said outlet-side plugs having porosity of 45% or less.

3. The ceramic honeycomb filter according to claim 1, wherein the flow-path-direction length of said outlet-side plugs is 6-30 times the width of said outlet-side plugs.

4. The ceramic honeycomb filter according to claim 1, wherein the flow-path-direction length of said outlet-side plugs is larger in a center portion than in a peripheral portion in a cross section perpendicular to the flow paths.

5. A method for producing a ceramic honeycomb filter comprising a honeycomb structure having large numbers of flow paths partitioned by porous cell walls, and plugs alternately formed in said flow paths on the exhaust-gas-inlet and outlet sides, said outlet-side plugs having porosity of 65% or less, and the upstream-side end surfaces of said outlet-side plugs having surface roughness Ra of 13 µm or more, comprising the steps of forming the outlet-side plugs with slurry containing ceramic powder having an average particle size of 5 µm or less, accumulating ceramic powder having an average particle size of 10-200 µm on the upstream-side end surfaces of the plugs, and integrally sintering them.

* * * * *